US011463864B2

(12) United States Patent
Veneroso et al.

(10) Patent No.: US 11,463,864 B2
(45) Date of Patent: Oct. 4, 2022

(54) METHOD FOR THE PERSONALIZATION OF INTEGRATED CIRCUIT CARDS, CORRESPONDING SYSTEM AND COMPUTER PROGRAM PRODUCT

(71) Applicant: STMicroelectronics S.r.l., Agrate Brianza (IT)

(72) Inventors: Amedeo Veneroso, Caserta (IT); Pasquale Vastano, Santa Maria Capua Vetere (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 638 days.

(21) Appl. No.: 16/366,870

(22) Filed: Mar. 27, 2019

(65) Prior Publication Data
US 2019/0306697 A1    Oct. 3, 2019

(30) Foreign Application Priority Data

Mar. 28, 2018  (IT) .......................... 102018000004046

(51) Int. Cl.
| | |
|---|---|
| *G06F 21/60* | (2013.01) |
| *H04W 8/18* | (2009.01) |
| *H04L 9/12* | (2006.01) |
| *H04W 4/50* | (2018.01) |
| *H04W 8/20* | (2009.01) |
| *H04W 12/30* | (2021.01) |

(52) U.S. Cl.
CPC .......... *H04W 8/183* (2013.01); *G06F 21/602* (2013.01); *H04L 9/12* (2013.01); *H04W 4/50* (2018.02); *H04W 8/205* (2013.01); *H04W 12/35* (2021.01)

(58) Field of Classification Search
CPC ............ H04W 8/183; H04W 4/50; H04L 9/12
See application file for complete search history.

(56) References Cited

U.S. PATENT DOCUMENTS

| | | | | |
|---|---|---|---|---|
| 5,557,679 A | * | 9/1996 | Julin ..................... | G06Q 20/355 380/249 |
| 2009/0124287 A1 | * | 5/2009 | Weiss ..................... | H04L 9/0897 455/558 |
| 2014/0045462 A1 | * | 2/2014 | Warnez ............ | G06Q 20/35765 455/411 |
| 2016/0249203 A1 | * | 8/2016 | Mazali ................... | H04W 12/04 |
| 2016/0302070 A1 | * | 10/2016 | Yang ..................... | H04W 12/42 |

FOREIGN PATENT DOCUMENTS

| | | |
|---|---|---|
| FR | 3011652 A1 | 4/2015 |
| WO | 9307697 A1 | 4/1993 |
| WO | 2016164632 A1 | 10/2013 |

* cited by examiner

*Primary Examiner* — Wasika Nipa
(74) *Attorney, Agent, or Firm* — Slater Matsil, LLP (57) ABSTRACT

A method for the personalization of an integrated circuit card, includes: simulating a downloading of a single image corresponding to a fixed part of personalization data of the integrated circuit card; simulating an execution of a sequence of personalization commands for the integrated circuit card to generate a set of personalization data; combining the set of personalization data with the single image to obtain a card image comprising the fixed part of personalization data and the set of personalization data; encrypting the card image to obtain an encrypted single image; and downloading the encrypted single image in a memory of the integrated circuit card.

20 Claims, 6 Drawing Sheets

METHOD FOR THE PERSONALIZATION OF INTEGRATED CIRCUIT CARDS, CORRESPONDING SYSTEM AND COMPUTER PROGRAM PRODUCT

CROSS-REFERENCE TO RELATED APPLICATIONS

This application claims the benefit of Italian Application No. 102018000004046, filed on Mar. 28, 2018, which application is hereby incorporated herein by reference.

TECHNICAL FIELD

Embodiments of the present disclosure relate to solutions for the personalization of integrated circuit cards.

BACKGROUND

Universal Integrated Circuit Cards (UICCs), often referred as Subscriber Identity Module (SIM) card, are widely used to enable the mobile devices to access services provided by Mobile Network Operators (MNOs).

Figure 1:
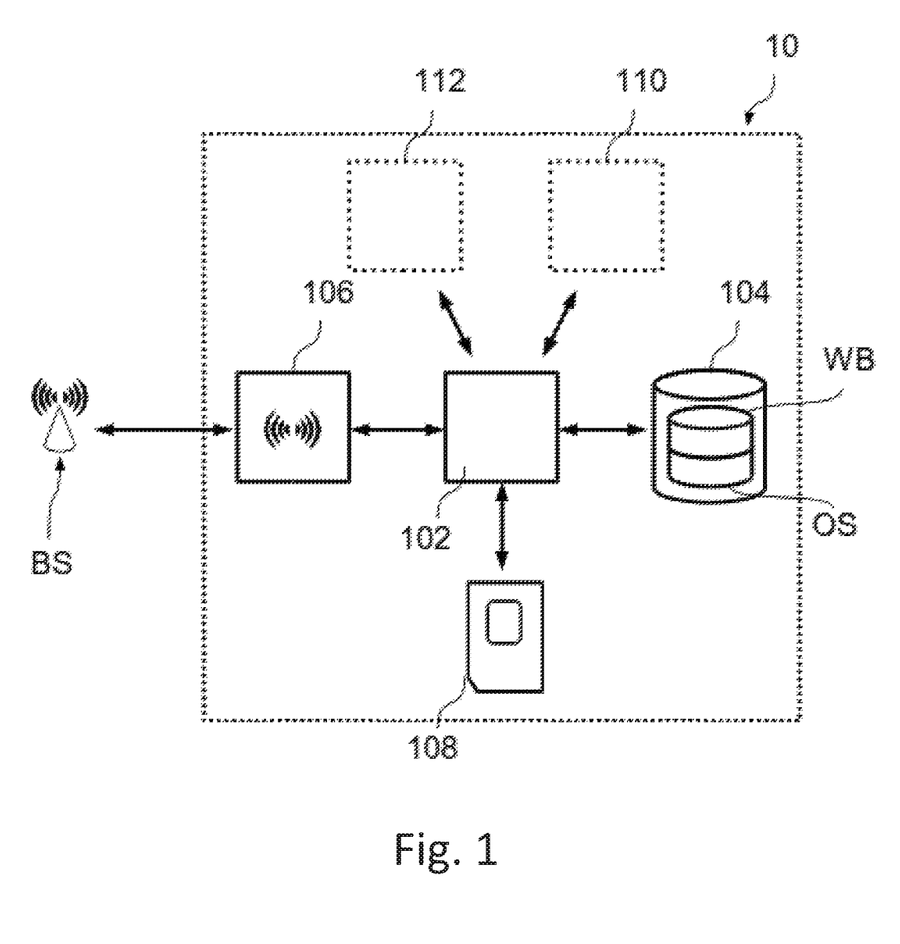

FIG. 1 shows a possible architecture of a user equipment or mobile equipment 10, such as a mobile device, e.g. a smartphone or a tablet, or a mobile communication module usually to be used in embedded systems.

Generally, the device 10 includes one or more processors 102 connected to one or more memories 104. The device 10 includes moreover at least one mobile communication interface 106 for radio communication over radio channel.

For example, the mobile communication interface 106 may include a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

A mobile device 10 includes often also a user interface no, such as a touchscreen or keypad. Conversely, a communication module to be used, e.g., in embedded systems, such as alarm systems, gas meters or other types of remote monitoring and/or control systems, often does not include a user interface no, but a communication interface 112 in order to exchange data with a further processing unit of an embedded system. For example, in this case, the interface 112 may be a digital communication interface, such as but not limited to a UART (Universal Asynchronous Receiver-Transmitter), SPI (Serial Peripheral Interface), I2C (Inter Integrated Circuit) and/or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by one or more analog interfaces and/or digital input/output ports of the processing unit 102.

The memory 104 may store e.g. an operating system OS being executed by the processor 102 and which manages the general functions of the device 10, such as the management of the user interface no and/or the communication interface 112 and the establishment of a connection with the base station BS of serving network via the interface 106. The memory 104 may also contain applications being executed by the operating system OS. For example, in the case of a mobile device, the memory 104 often includes a web browser application WB.

For establishing a connection with the base station BS, the device 10 is coupled to a processing unit 108 configured to manage the user identification. For example, usually a mobile device includes a card holder for receiving a card including a Subscriber Identity Module (SIM), which is usually called SIM card. For example, nowadays is often used a Universal Integrated Circuit Card (UICC), which is a smart card often used, but not limited, in GSM, UMTS, LTE, W-CDMA, 5G networks. The UICC ensures the integrity and security of all kinds of personal data and typically holds a few hundred kilobytes.

For example, processing unit 108 may contain a SIM application, a USIM application, an ISIM application, a CSIM application in order to provide more services to the card holder like the storage of a phone book and other applications.

Accordingly, the reference to a SIM module in the following of the present description is intended to include modules for the above networks and applies also the case in which such a SIM module is provided on a SIM card. Moreover, the present description applies also to so called Machine-to-Machine (M2M) SIM modules.

Those of skill in the art will appreciate that the communication between the device 10 and the processing unit 108 follows the master/slave principle, in which the device 10 represents the master and the processing unit 108 represents the slave. For this reason, the device 10 sends given commands to the processing unit 108 and the processing unit 108 acknowledges the command.

Figure 2:
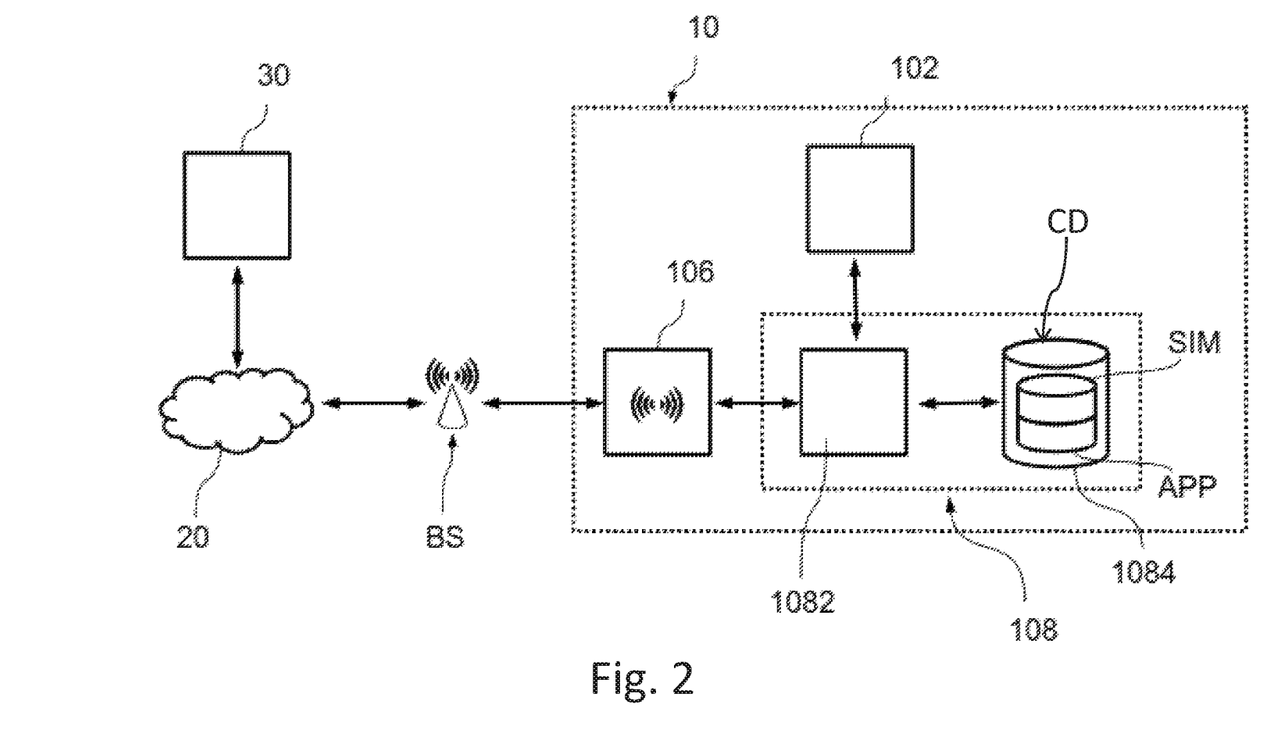

As shown in FIG. 2, processing unit 108 often includes one or more processors 1082, e.g. in the form of a co-processor, and one or more memories 1084 for executing applications stored in the memory 1084 of the processing unit 108.

For example, the processing unit 108 may include, in addition to the Subscriber Identity Module application (reference sign SIM in FIG. 2), at least one further application APP, which may be for instance a Java applet. For example, this application APP may be configured to communicate (usually via the processor 102 and possibly the operating system OS) with the mobile communication interface 106 in order to send data to and/or receive data from the device 10 on behalf of a remote host 30.

For this purpose, the host 30 may be connected via a network 20 to the base station BS. Accordingly, connection between the host 30 and the processing unit 108 may be established by the network 20, the base station BS and the communication interface 106.

Generally, the communication may be initiated by the host 30 or requested by the processing unit 108.

For example, the application APP may be a web server application, which receives requests from the web browser WB of a mobile device 10 and obtains respective content from a remote host 30, such as a web server.

The application APP may also be an authentication application. In this case, the host 30 may send an authentication request to the processing unit 108 via the device 10 and the processing unit 108 shall send an authentication response to the host 30 via the same device 10.

One or more profiles of mobile network operators (MNOs) can be stored in the processing unit 108. Each profile is represented by a memory area in the memory 1084 of the processing unit 108 for storing applications APP, such as a respective applet for each profile. The content of the processing unit 108, and in particular of the non-volatile memory 1084 can be indicated, as a whole, as card information which corresponds to a data image of card data CD.

Thus, a processing unit 108 usually includes a microprocessor and a memory, typically including a non-volatile and a volatile portion. Such memory, for instance a flash memory, can be divided in a memory pages. Such memory is configured to store data such as an operative system, applets and an MNO profile that a mobile device can utilize to register and interact with an MNO. The processing unit 108 can be removably introduced in a slot of a device, i.e. a mobile device, or they can also be embedded directly into the devices, in this case they are called eUICC, and such eUICC cards are useful since for their nature are designed to remotely receive MNO profiles.

Such profiles, and also the other card information however have to be personalized with data specific of the card, such as the authentication keys. The personalization of profiles in processing unit 108 (e.g. UICC and eUICC cards) is quite a sensitive and complex task to optimize, also because due to security requirements it is necessary to protect all the data, for instance through encryption. Also the amount of data used to personalize processing unit 108 (e.g. UICC and eUICC cards) continuously increase in time.

Finally, new techniques like OFL (Open Firmware Loader) and iUICC introduce personalization procedures also at OEM side (Original Equipment Manufacturer and via OTA (On the Air).

Thus a problem is to optimize personalization of processing unit 108 (e.g. UICC and eUICC cards), both in terms of throughput and of data sharing.

More specifically, a difficulty is introduced by the fact that the personalization data of processing unit 108 (e.g. an UICC or eUICC) are made by two components: (1) a "fixed" part, which is equal for a given set or batch of cards; and (2) a "variable" part, with personalization data inside.

The fixed part is typically larger than the variable part.

The variable part is sparse inside the image of the data which is copied into the card.

Typically there are two main method of personalization.

A first method envisages that a single image is downloaded for the fixed part on a specific batch of cards.

Then a sequence of personalization is built ad-hoc card by card, for instance data with the respective authentication key, are written in the card.

This method is of general application, but not very efficient in terms of throughput because the execution of the personalization commands may be slow and application dependent. As an example, specific personalization information may be part of an application installation command, so the execution time of the personalization would be the execution time of the application installation.

Another method envisages that a single image is downloaded for the fixed part on a specific batch of cards. Another image containing the personalization data is downloaded in a subset of the memory; the operative system then needs to move such data to the proper addresses. This method is more specific since the operative system needs to know where the personalization data are to be stored and it has limitations in applicability when the entity to be personalized on the card is an application not managed directly by the operating system maker.

On the basis of the foregoing description, the need is felt for solutions which overcome one or more of the previously outlined drawbacks.

SUMMARY

According to one or more embodiments, such an object is achieved through methods having the features set forth in the description that follows. Embodiments moreover concerns a related system for the personalization of profiles in integrated circuit cards as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present disclosure provides solutions regarding a method for the personalization of integrated circuit cards, including a simulation procedure including the steps of: simulating a downloading of a single image corresponding to a fixed part of personalization data of the integrated circuit card; simulating an execution of a sequence of personalization commands to introduce a set of personalization data in the single image obtaining a card image including the fixed part and the set of personalization data; encrypting the card image obtaining an encrypted single image, the encrypted single image being then downloaded in a memory of the given card.

In variant embodiments, the method here described may include that the encryption is performed by a Hardware Security Module (HSM) with a same transport key available at the given card.

In variant embodiments, the method here described may include that the downloading an encrypted single image in a memory of the given card includes transmitting to a production machine the encrypted single image and downloading from the production machine the encrypted single image in the memory of the given card.

In variant embodiments, the method here described may include performing a plurality of simulation procedures for a plurality of different cards sharing a same fixed part of personalization data and obtaining a plurality of encrypted single images, further including: comparing the plurality of encrypted single images; while the encrypted single images are equal, identifying and storing portions of the fixed part; when the encrypted single images are different, identifying and storing portions of the personalization data; performing a reset of the encryption of the card images to an initial state, starting again the encryption of the card images after the different portion; when the comparison is complete, sending the stored portions of the fixed part and the stored portions of the personalization data.

In variant embodiments, the method here described may include that the comparison of the encrypted single images is performed by memory pages or by blocks having the size of the plaintext blocks inputted in the encryption operation.

The present disclosure provides also solutions regarding a system for the personalization of integrated circuit cards, in particular eUICC cards, including at least a simulation unit and a production machine configured to implement the method of any of above embodiments.

In variant embodiments, the system here described may include that the simulation unit is implemented on a server or system of servers separated by the production machine.

The present disclosure provides also solutions regarding a computer-program product that can be loaded into the memory of at least one processor and includes portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which:

FIGS. 1 and 2 have been already described in the foregoing;

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present disclosure relate to solutions for the personalization of integrated circuit cards, for example, Universal Integrated Circuit Card (UICC cards), including downloading, in a given card, a set of data which includes a fixed part corresponding to a pre-personalization of the card and personalization data specific of the given card to be introduced in the fixed part.

Embodiments of the present disclosure relate in particular to eUICC (embedded Universal Integrated Circuit Card).

The solution here described substantially provides a simulation of the steps of downloading a single image corresponding to the fixed part of personalization data and executing a sequence of personalization data in the profile stored in the card, in order to obtain a single data image, which, after an encryption, is physically downloaded in the memory of the card.

Figure 3:
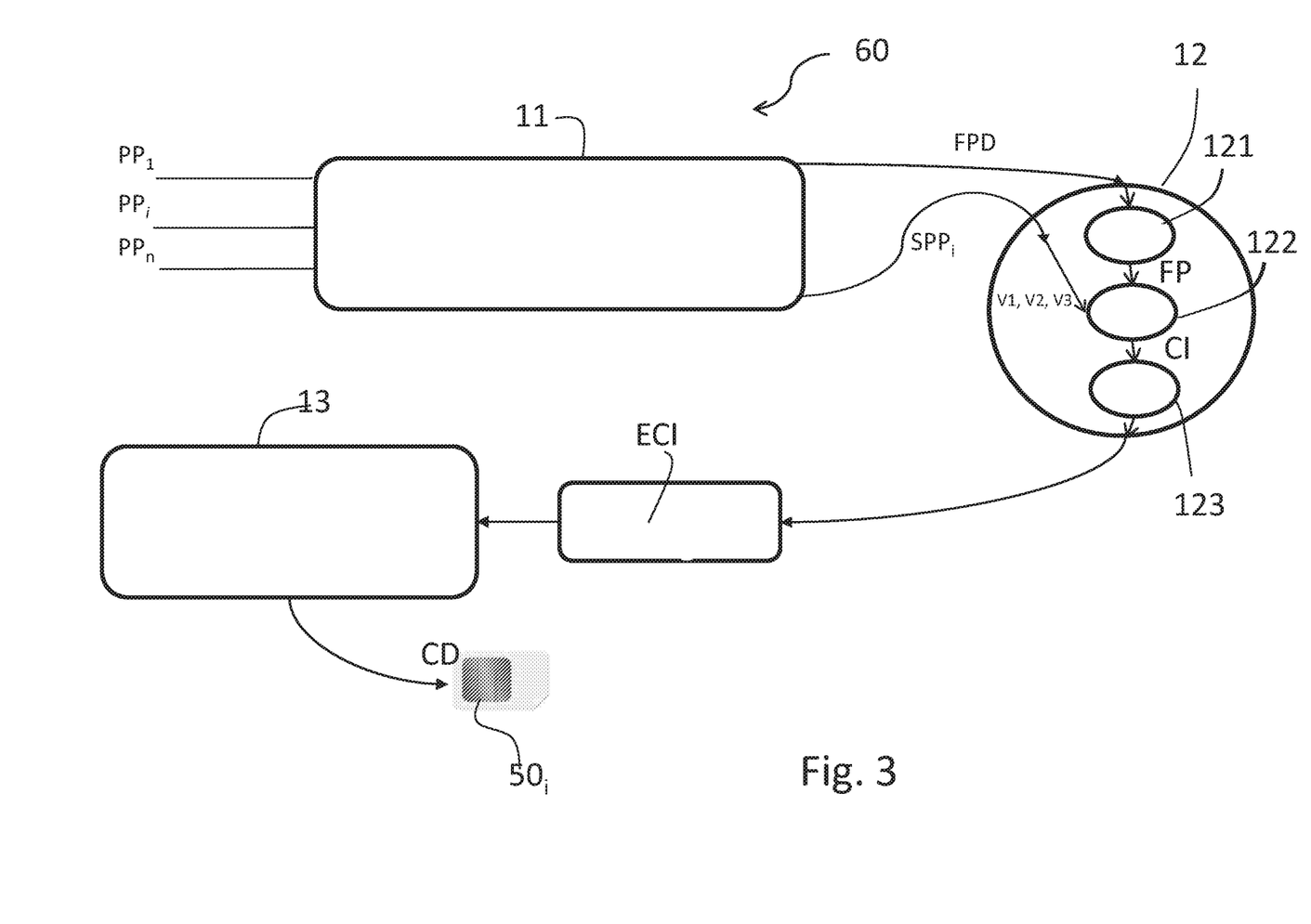
FIG. 3 shows a block schematics of a system implementing the method here described.

FIG. 3 schematically represents a system for the personalization of profiles in integrated circuit cards, indicated as a whole with the reference number 60.

Such system 60 includes a block representing a personalization bureau 11, which is an entity which (on the basis for instance of an input file of personalization data from a client, e.g. a MNO, containing different sets of personalization data for different cards $50_1 \ldots 50_i \ldots 50_n$) prepares corresponding sequences of personalization SPP, in $SPP_1, \ldots SPP_i \ldots SPP_n$ ad hoc for each card. FIG. 3 shows the i-th integrated circuit card $50_i$, i being an index going from 1 to n, the number of integrated circuit cards to be personalized. The personalization bureau 11 can correspond to a team of technicians, which team writes the sequences of personalization SSP, or in some cases this can be performed automatically by a processing system embodying the personalization bureau 11. The sequence of personalization SPP typically includes a plurality of lists of commands, each list of commands being able to modify the i-th card with corresponding i-th personalization data $PP_i$. While in the prior art, as mentioned, such sequences of personalization SSP are written directly in the data image corresponding to fixed card, the system 10, in contrast, includes at least a simulation module 12, which is for instance hosted in a server or system of servers.

Such simulation module 12 receives the i-th sequence of personalization SSPi and data of the fixed part FDP. The simulation module 12 includes a fixed part simulation sub-module 121, which simulates, for a given i-th card, the creation of an image of a fixed part FP. The simulation module further includes a personalization simulation sub-module 122, which simulates the introduction of variable data $V_1, V_2, V_3$ into the image of the fixed part FP according to the sequence of personalization SSPi, so that a single image CI is obtained. Such single image CI is then encrypted in an encryption sub-module 123, in the example implementing an AES-CBC (Advanced Encryption Standard (AES) Cipher Algorithm in Cipher Block Chaining (CBC)) Mode) encryption to obtain an encrypted single image ECI.

The encrypted single image ECI when completed is dumped from the simulation module 12 to a production machine 13, which stores the encrypted single image ECI as card data in the i-th UICC card $50_i$, specifically in the non-volatile memory 1084 of the UICC card $50_i$. The production machine 13 which produces such a specific card is known by the man skilled in the art. It performs both mechanical (card construction, serigraphy process to print specific information on the faces of the card, . . . ) and electrical (downloading in the card the content of the memory, for instance dumping in the memory a data image) operations.

Figure 4:
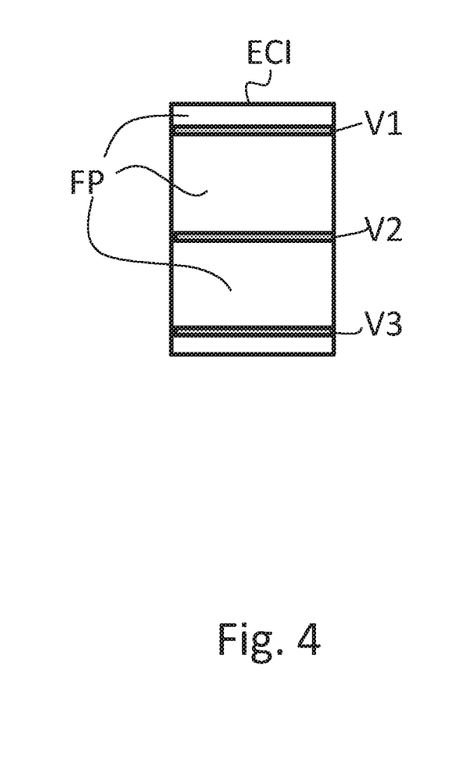
FIG. 4 shows schematically an element of the system of FIG. 3.

FIG. 4 shows the encrypted image ECI which contains the variable parts $V_1, V_2, V_3$, inserted according to the i-th sequence SPPi, in the fixed part FP.

Figure 5:
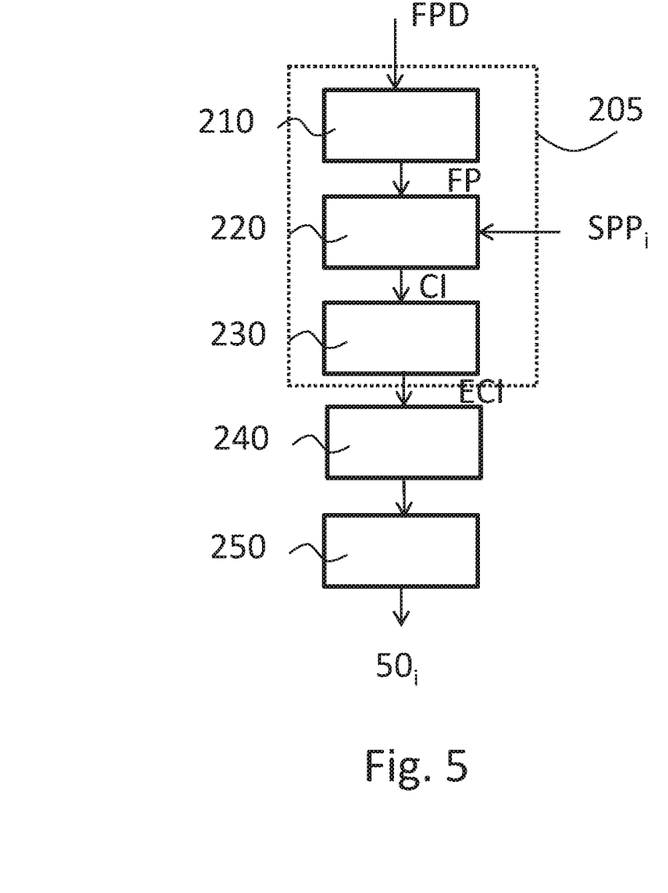
FIG. 5 shows a diagram flow illustrating an embodiment of the method here described.

FIG. 5 shows a flow diagram representing an embodiment of the method here described, indicated as a whole with the reference 200.

In a step 210 is performed a step of simulating downloading a single image corresponding to the fixed part FP. In the example shown, also with reference to FIG. 3, fixed part data FPD are provided, e.g. at the submodule 121 of the simulation block 12 and it is simulated downloading, i.e. writing, the data image of the fixed part in a simulated non-volatile memory of a simulated card. Such fixed part data FPD are sent from the personalization bureau 11 to the simulation block 12, and correspond to a sequence of memory pages, such memory pages forming fixed part data FPD being stored through the submodule 121 in the non-volatile memory of the card simulated at the simulation block 12, which is embodied for instance by a flash memory, organized in pages or blocks. In this case the submodule 121 may be absent or representing simply the operation of accessing the fixed part FP pre-loaded in the simulation block 12.

However, in variant embodiment, such step 210 may include that the fixed part FP is preloaded in the simulation block 12, i.e. it is loaded before the loading in the simulation block of the command sequences $SPP_1 \ldots SPP_n$. Having the simulation block 12 pre-configured, i.e. pre-loaded, with the fixed part FP makes simulation operations faster. Subsequently a script corresponding to the i-th sequence $SPP_i$ is executed (see step 220 below). The fixed part data FPD contains also the other data composing the whole image to be downloaded in the card $50_i$, including the operative system and the applications.

Then in a step 220 is performed simulating execution of a sequence of personalization commands $SPP_i$ to introduce a set of personalization data in the single image represented by the fixed part FP which downloading was simulated at the previous step 210, in which the sequence SPP for a given card 50 is provided and the simulation operation of modifying the data image of the fixed part is performed (submodule 122). A single card image CIi is obtained.

In a step 230 the single card image CI is encrypted into an encrypted card image ECI. In order to allow a properly secured environment, images can be encrypted when moved from one server, e.g. the simulation block 12 of FIG. 3, to another, e.g. production machine 13. As mentioned, AES-CBC encryption can be used. The encryption 230 is performed by an HSM (Hardware Security Module), which can correspond to the submodule 123 of FIG. 3, and has a same transport key of the given i-th card $50_i$ in which the encrypted card image ECI must be downloaded. In this way only HSM 123 can encrypt and only given i-th UICC card $50_i$ can decrypt.

Thus, a simulation procedure 205 is defined, including such steps 210, 220, and 230, which produces, as output, an encrypted card image ECI.

In a step 240 the encrypted card image ECI is then transmitted to the production machine 13, which, in a step 250, downloads the encrypted card image ECI in the given card $50_i$.

The solution described in general with reference to FIGS. 3 to 5 produces a single encrypted card image ECI, which includes all the data, from operative system to personalization data. The solution is more efficient in terms of throughput because the execution of the personalization commands is performed at the simulator.

Into this context, it can be further considered that the amount of data that needs to be transmitted is very high. In order to transmit data for a number n of 1,000,000 of 1.2 MB cards, which can be a typical volume for a personalization, 1.2 TB of data are required. Transmitting such amount to production machines, i.e. the machines dumping the final image on each card, might be the bottleneck of the production.

It is therefore here described an embodiment of the method, which reduces such amount of data to be transmitted by taking in consideration that the images of two integrated circuit cards may differ one from the other only for few portions, e.g. the variable portions V1, V2, . . . , while their fixed parts are equal.

However, the encryption of the image ECI makes it difficult to understanding which part is fixed and which is variable, since the image ECI is encrypted. With some encryption algorithms such AES-CBC, it is not possible to identify the variable data, since a modification affects the whole of the remaining encrypted data, also the ones of the fixed part.

Figure 6:
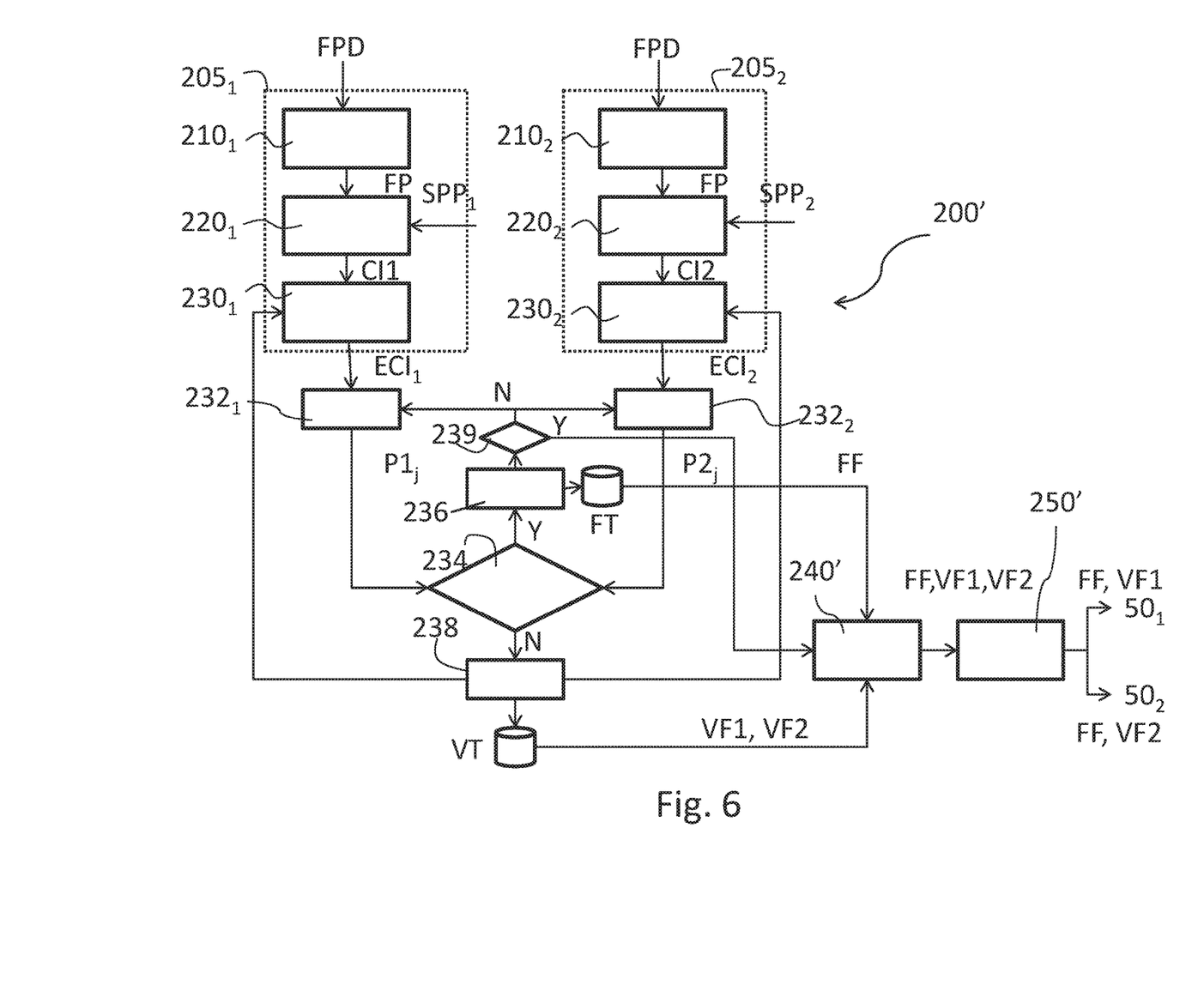
FIG. 6 shows a diagram flow illustrating another embodiment of the method here described.

FIG. 6 shows a schematic diagram representing operations of the embodiment 200' of the method here described, which identifies the portions, in the example FP1, FP2, FP3, FP4 of the fixed part FP and portions of the variable data V1, V2 . . . , in the example V11, V12, V13 and V21, V22, V23 respectively, for variable data V1 and V2 res using an incremental dump approach.

Such embodiment substantially provides carrying out the dump of at least two encrypted card image $ECI_1$ and $ECI_2$ in parallel on different UICC simulators $12_1$, $12_2$, comparing the two encrypted card image $ECI_1$ and $ECI_2$ while they are being outputted by the encryption modules. When an encrypted image, e.g. $ECI_1$ differs from the other, e.g. $ECI_2$, then a personalization part or portion of a personalization part is identified in $ECI_1$, and stored in a corresponding variable file euicc1_var1.enc. And similarly a personalization part of a portion of personalization part is identified in $ECI_2$ and stored in a corresponding variable file euicc2_var1.enc.

Such identified personalization part or portion of the personalization part is then skipped. The encryption process 230 is then reset to the initial state and a new encryption of the card image is initiated on both simulators 12a, 12b. The skipping of the personalization part or portion of the personalization part operation is performed, for instance, one page of the content of the non-volatile memory per time. Thus, the encryption is reset to start from the next page memory of the encrypted image. In variant embodiments, such comparing step can be performed instead of one memory page per time, comparing a block of bits of encrypted image having the size on plaintext input blocks to the encryption operation, e.g. one block size of input bits that the state matrix of the AES encryption process can manage per time, a size which should vary from 128 to 256 bits. Thus, the comparison operation includes performing the comparison operations of the encrypted single images $ECI_1$, $ECI_2$ by memory pages or by blocks having the size of the plaintext blocks inputted in the encryption operation.

Figure 7:
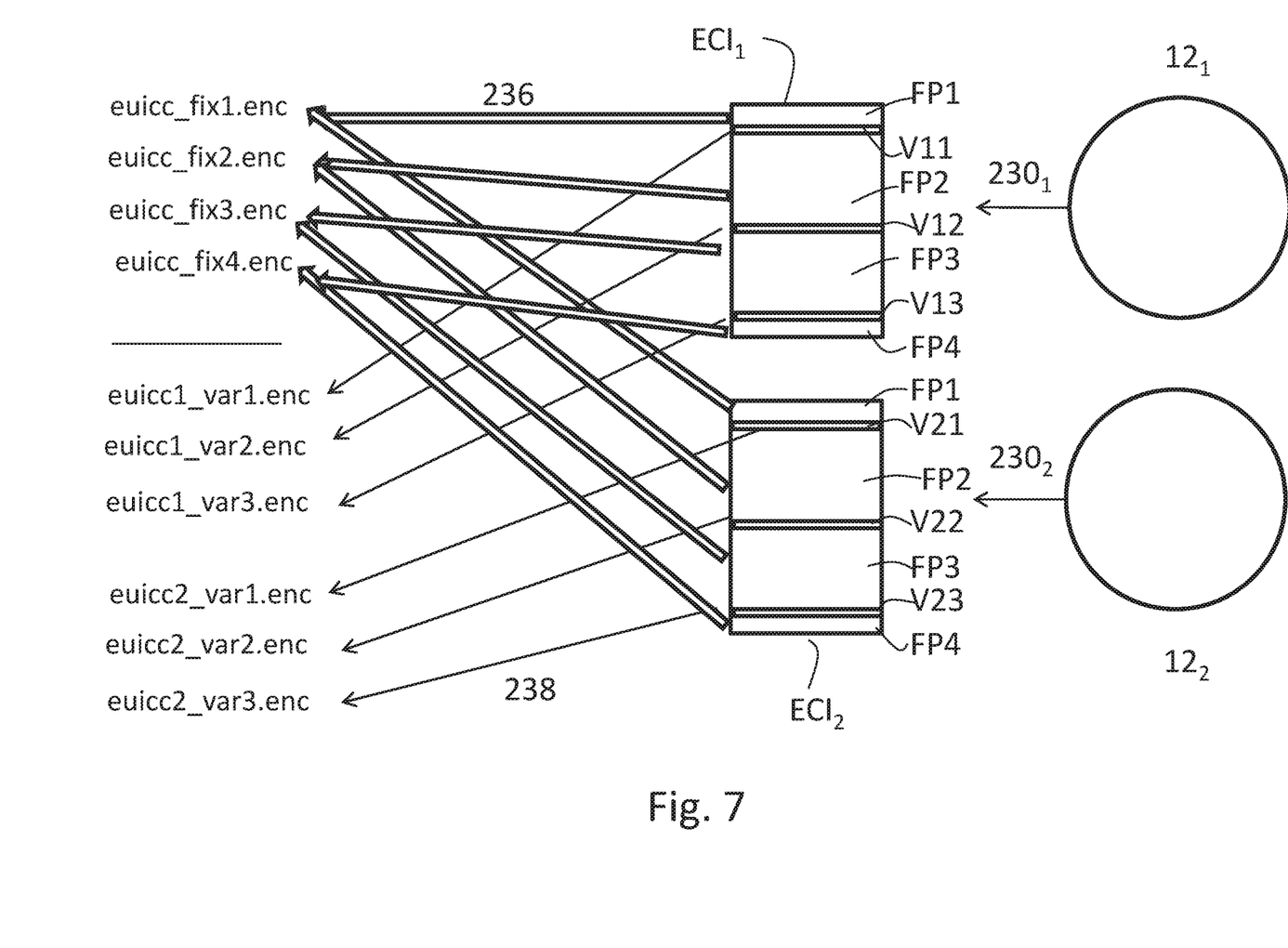
FIG. 7 shows a block schematics of a system implementing the method here described.

Also with reference to FIG. 7, where block schematics show some of the entities and the operations of the embodiment 200' of the method here described, the method includes the following operations.

The fixed part data FPD are provided to both simulators $12_1$, $12_2$, which perform corresponding two parallel simulation procedures $205_1$, $205_2$ outputting respective encrypted card images $ECI_1$, $ECI_2$ and including parallel steps $210_1$, $210_2$ of simulated writing the data image of the fixed part, like in previous step 210. As mentioned, the fixed part FP may not be loaded together with commands $SPP_i$ in the simulation block 12, the simulation being instead pre-configured, i.e. pre-loaded, in order to obtain a faster simulation. From such steps $210_1$, $210_2$ a same fixed part FP is obtained for the two simulators 12.

Then parallel steps $220_1$, $220_2$ are performed, corresponding to step 220, i.e. respective sequences $SPP_i$ for given cards 501 and 502 are provided and the simulation operation of modifying the data image of the fixed part is performed. Two respective single card image $CI_1$, $CI_2$ are obtained.

Then parallel steps $230_1$, $230_2$ are performed corresponding to step 230, in which the single card image $CI_1$, $CI_2$ are encrypted into respective encrypted card images $ECI_1$, $ECI_2$.

Then, in parallel steps $232_1$, $232_2$, are taken, in sequence, the j-th pages $P_{1j}$, $P_{2j}$, j being an index varying from 1 to N, where N is the number of pages composing the encrypted card images ECI, of the respective encrypted card images $ECI_1$, $ECI_2$ and sent to a comparison step 234. The size of a page is for instance 256 byte.

The comparison step 234 compares the two pages $P_{1j}$, $P_{2j}$. If the two pages $P_{1j}$, $P_{2j}$, are equal, then pages are considered as belonging to at least a portion, e.g. FP1, of the fixed part FP and a step 236 of storing the page in a file euicc_fix1.enc dedicated to a portion FP1 of the fixed part FP is performed. Of course since the page is the same, a sole page is stored in a sole file.

Then in a step 239 is verified if the pages $P_{1j}$, $P_{2j}$, are the last of the encrypted card images $ECI_1$, $ECI_2$.

In the negative, control is returned to steps $232_1$, $232_2$ which extract the following pages, $P_{1j}+1$, $P_{2j}+1$ for the comparison 234. This means that, usually extending portion FP1 of the fixed part FP for several pages, such several pages are written in sequence in the fixed part file euicc_fix1.enc. With FT is indicated a data structure for the storage of such fixed part files.

In the affirmative, control is passed to transmission step 240', which will be illustrated in a later part of the specification.

If the comparison step 234 indicated that the pages $P_1j$, $P_{2j}$, are different, then the two different pages $P_{1j}$ and $P_{2j}$ are stored in two respective variable files euicc1_var1.enc and euicc2_var1.enc Also in step 238 the encryption steps $230_1$, $230_2$, are reset, i.e. the initialization vector of the AES-CBC is reset and the encryption is started from the next page of the ECI after the page that differs, i.e. if the different page is $P_{1j}$, $P_{2j}$, then the encryption is reset and starts from pages $P_{1j}+$, $P_{2j}+1$.

If there are differing continuous pages, they are introduced in sequence in the same file.

Thus, if, like shown in FIG. 7, the first encrypted image $ECI_1$ includes portions FP1, FP2, FP3, FP4 of the fixed part FP and different portions V11, V12, V13, and the second encrypted image ECI2 includes portions FP1, FP2, FP3, FP4 of the fixed part FP and different portions V21, V22, V23, for the fixed part FP is stored a single set FF, including files euicc_fix1.enc, euicc_fix2.enc, euicc_fix$_3$.enc, euicc_fix$_4$.enc, which together correspond to the image of the fixed part FP. The different portions generate two set of files, VF1, corresponding to files euicc1_var1.enc, euicc1_var2.enc euicc1_var3.enc, and set of file VF2, corresponding to files euicc2_var1.enc euicc2_var2.enc, euicc2_var3.enc, respectively corresponding to different portions V11, V12, V13 and V21, V22, V23.

As mentioned when the test step 239 signals that the whole image $ECI_1$, $ECI_2$ has been processed in the comparison step 238, control is passed to transmission step 240', which takes the single set FF for the fixed part FP and the two set VF1, VF2 for the different parts and sends them to the production machine 13.

The production machine 13 in a step 250' writes in each card 501, 502 the fixed part FP and the corresponding set of different parts VF1 or VF2.

The described solution thus has several advantages with respect to the prior art solutions.

With respect to the execution by real cards of the personalization commands, it is obtained a much faster personalization execution, which increases throughput.

Also it reduces the amount of memory to be transferred, since the encrypted files of the fixed part are transmitted only once for two or more cards, an aspect which again may reduce the throughput.

The solution here described using encrypted transmission, increases security.

Also the described solution does not have the personalization data limited to a specific memory area and does not have impact on the operative system.

Of course, without prejudice to the principle of the invention, the details of construction and the embodiments may vary widely with respect to what has been described and illustrated herein purely by way of example, without thereby departing from the scope of the present invention.

The solution here described, as indicated, can applied to integrated circuit in card, in particular removable UICC cards and eUICC, but also to integrated circuit cards used for smart cards employed in applications different from mobile communication, such as credit cards and smart cards for identification/access purpose.

What is claimed is:

1. A method for personalization of an integrated circuit card, the method comprising:
    simulating a downloading of a single image corresponding to a fixed part of personalization data of the integrated circuit card by receiving, at an intermediate device, the single image sent from a personalization bureau, the fixed part being shared by another integrated circuit card;
    using the intermediate device, simulating an execution of a sequence of personalization commands for the integrated circuit card to generate a variable part comprising a set of personalization data, the variable part being unique to the integrated circuit card;
    using the intermediate device, combining the variable part with the single image to obtain a card image comprising the fixed part of personalization data and the variable part, the card image being unique to the integrated circuit card, the fixed part taking a larger space of the card image than the variable part;
    using the intermediate device, encrypting the card image to obtain an encrypted single card image;
    comparing the encrypted single card image with another encrypted single card image of the another integrated circuit card to identify a portion of the encrypted single card image that is identical to the another encrypted single card image; and
    downloading the encrypted single card image from the intermediate device in a memory of the integrated circuit card.

2. The method of claim 1, wherein the encrypting the card image is performed by a Hardware Security Module.

3. The method of claim 2, wherein the Hardware Security Module comprises a transport key identical to a transport key available at the integrated circuit card.

4. The method of claim 1, wherein downloading the encrypted single card image in the memory of the integrated circuit card comprises transmitting the encrypted single card image to a production machine and downloading the encrypted single card image from the production machine into the memory of the integrated circuit card.

5. The method of claim 1, wherein simulating the downloading of the single image corresponding to the fixed part of personalization data of the integrated circuit card comprises:
    simulating the integrated circuit card using a simulated card;
    simulating a non-volatile memory of the integrated circuit card using a simulated memory; and
    writing a data image of the fixed part of personalization data of the integrated circuit card into the simulated memory.

6. The method of claim 1, wherein combining the variable part with the single image to obtain the card image comprises interleaving the fixed part of personalization data with the set of personalization data.

7. A method for personalization of a plurality of integrated circuit cards sharing a same fixed part of personalization data, the method comprising:
    generating a plurality of encrypted single images for the plurality of integrated circuit cards, wherein generating the plurality of encrypted single images comprises, for each respective integrated circuit card of the plurality of integrated circuit cards:
simulating a downloading of a single image corresponding to a fixed part of personalization data of the respective integrated circuit card;
simulating an execution of a sequence of personalization commands for the respective integrated circuit card to generate a set of personalization data;
combining the set of personalization data with the single image to obtain a card image comprising the fixed part of personalization data and the set of personalization data; and
encrypting the card image to obtain a respective encrypted single image;
comparing a first encrypted single image of the plurality of encrypted single images with a second encrypted single image of the plurality of encrypted single images;
identifying portions of the first encrypted single image and the second encrypted single image that are identical as the same fixed part of personalization data;
storing the same fixed part of personalization data;
identifying portions of the first encrypted single image and the second encrypted single image that are different as the set of personalization data of the first encrypted single image and the set of personalization data of the second encrypted single image; and
storing the set of personalization data of the first encrypted single image and the set of personalization data of the second encrypted single image.

8. The method of claim 7, further comprising:
when portions of the first encrypted single image and the second encrypted single image are different, resetting encryption of card images for the plurality of integrated circuit cards to an initial state; and
resuming encryption of the card images to portions of the card images that occur after the portions of the first encrypted single image and the second encrypted single image that are different.

9. The method of claim 7, further comprising sending the same fixed part of personalization data, the set of personalization data of the first encrypted single image, and the set of personalization data of the second encrypted single image to a production machine.

10. The method of claim 7, wherein comparing the first encrypted single image of the plurality of encrypted single images and the second encrypted single image of the plurality of encrypted single images comprises a comparison of memory pages of the first encrypted single image and memory pages of the second encrypted single image.

11. The method of claim 7, wherein comparing the first encrypted single image of the plurality of encrypted single images and the second encrypted single image of the plurality of encrypted single images comprises a comparison of blocks of the first encrypted single image and blocks of the second encrypted single image having a size of plaintext blocks inputted in the encrypting.

12. The method of claim 7, wherein simulating the downloading of the single image corresponding to the fixed part of personalization data of the respective integrated circuit card comprises:
simulating the respective integrated circuit card using a simulated card;
simulating a non-volatile memory of the respective integrated circuit card using a simulated memory; and
writing a data image of the fixed part of personalization data of the respective integrated circuit card into the simulated memory.

13. The method of claim 7, wherein combining the set of personalization data with the single image to obtain the card image comprises interleaving the fixed part of personalization data with the set of personalization data.

14. The method of claim 7, wherein the encrypting the card image is performed by a Hardware Security Module.

15. The method of claim 14, wherein the Hardware Security Module comprises a transport key identical to a transport key available at the respective integrated circuit card.

16. A system, comprising a hardware processor and memory, for personalization of an integrated circuit card, the system being programmed with instructions to:
simulate a downloading of a single image corresponding to a fixed part of personalization data of the integrated circuit card, the fixed part being shared by another integrated card;
simulate an execution of a sequence of personalization commands for the integrated circuit card to generate a variable part comprising a set of personalization data, the variable part being unique to the integrated circuit card;
combine the variable part with the single image to obtain a card image comprising the fixed part of personalization data and the variable part, the card image being unique to the integrated circuit card, the fixed part taking a larger space of the card image than the variable part; and
encrypt the card image to obtain an encrypted single card image;
compare the encrypted single card image with another encrypted single card image of the another integrated circuit card to identify a portion of the encrypted single card image that is identical to the another encrypted single card image; and
perform mechanical and electrical operations to produce the integrated circuit card by writing the encrypted single card image in a memory of the integrated circuit card.

17. The system of claim 16, wherein the system is programmed to combine the variable part with the single image to obtain the card image by interleaving the fixed part of personalization data with the variable part.

18. A computer-program product comprising a non-transitory computer readable storage medium storing programming, the programming including instructions to:
simulate a downloading of a single image corresponding to a fixed part of personalization data of an integrated circuit card, the fixed part being shared by another integrated card;
simulate an execution of a sequence of personalization commands for the integrated circuit card to generate a variable part comprising a set of personalization data, the variable part being unique to the integrated circuit card;
combine the variable part with the single image to obtain a card image comprising the fixed part of personalization data and the variable part, the card image being unique to the integrated circuit card, the fixed part taking a larger space of the card image than the variable part; and
encrypt the card image to obtain an encrypted single card image;

compare the encrypted single card image with another encrypted single card image of the another integrated circuit card to identify a portion of the encrypted single card image that is identical to the another encrypted single card image; and download the encrypted single card image in a memory of the integrated circuit card.

19. The method of claim 1, further comprising preparing the sequence of personalization commands using the personalization bureau.

20. The method of claim 4, further comprising performing mechanical operations to construct the integrated circuit card using the production machine.

* * * * *